May 8, 1934. H. H. LOGAN 1,957,658
SHOCK ABSORBER CONTROL
Filed March 4, 1932 3 Sheets-Sheet 2
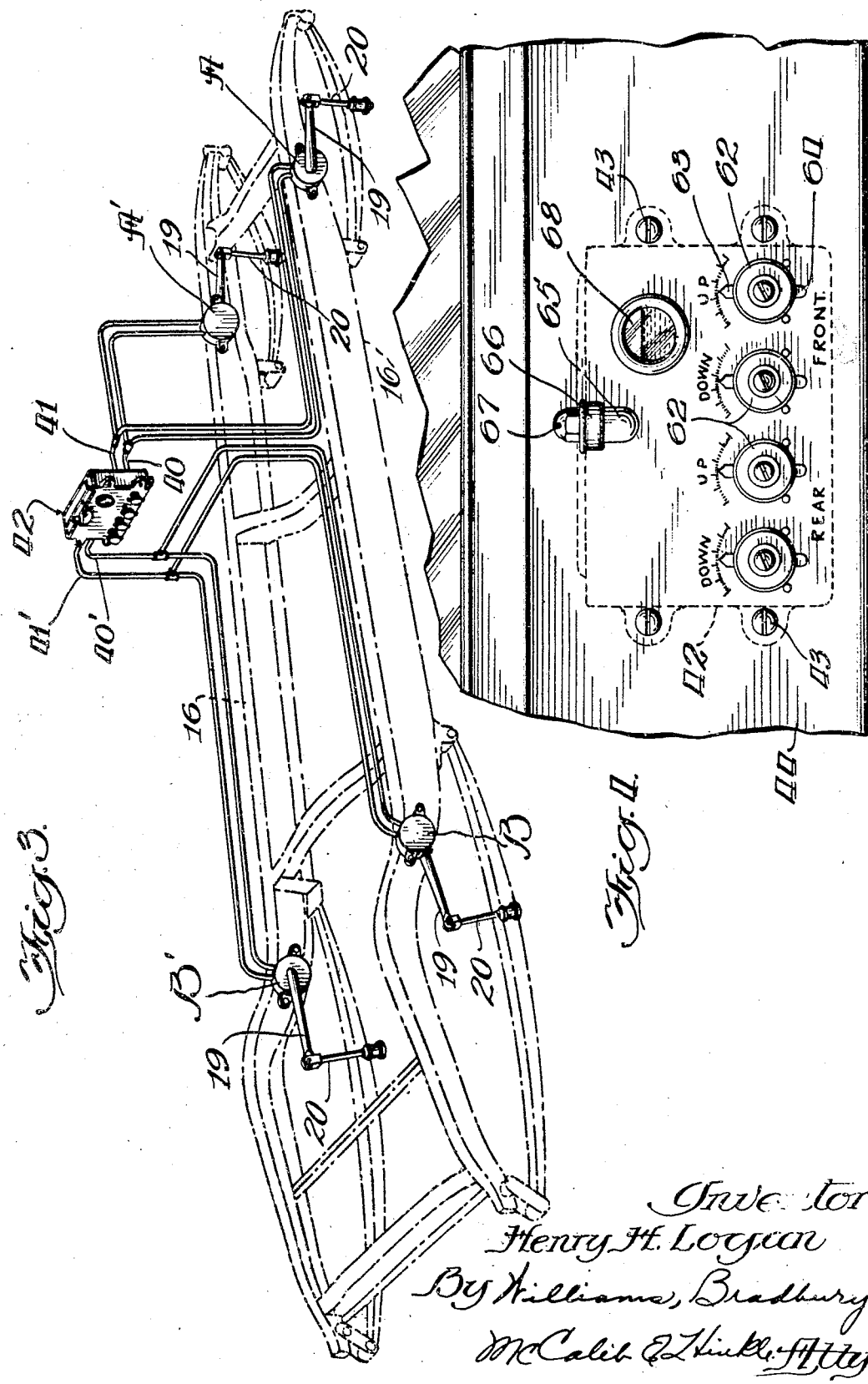

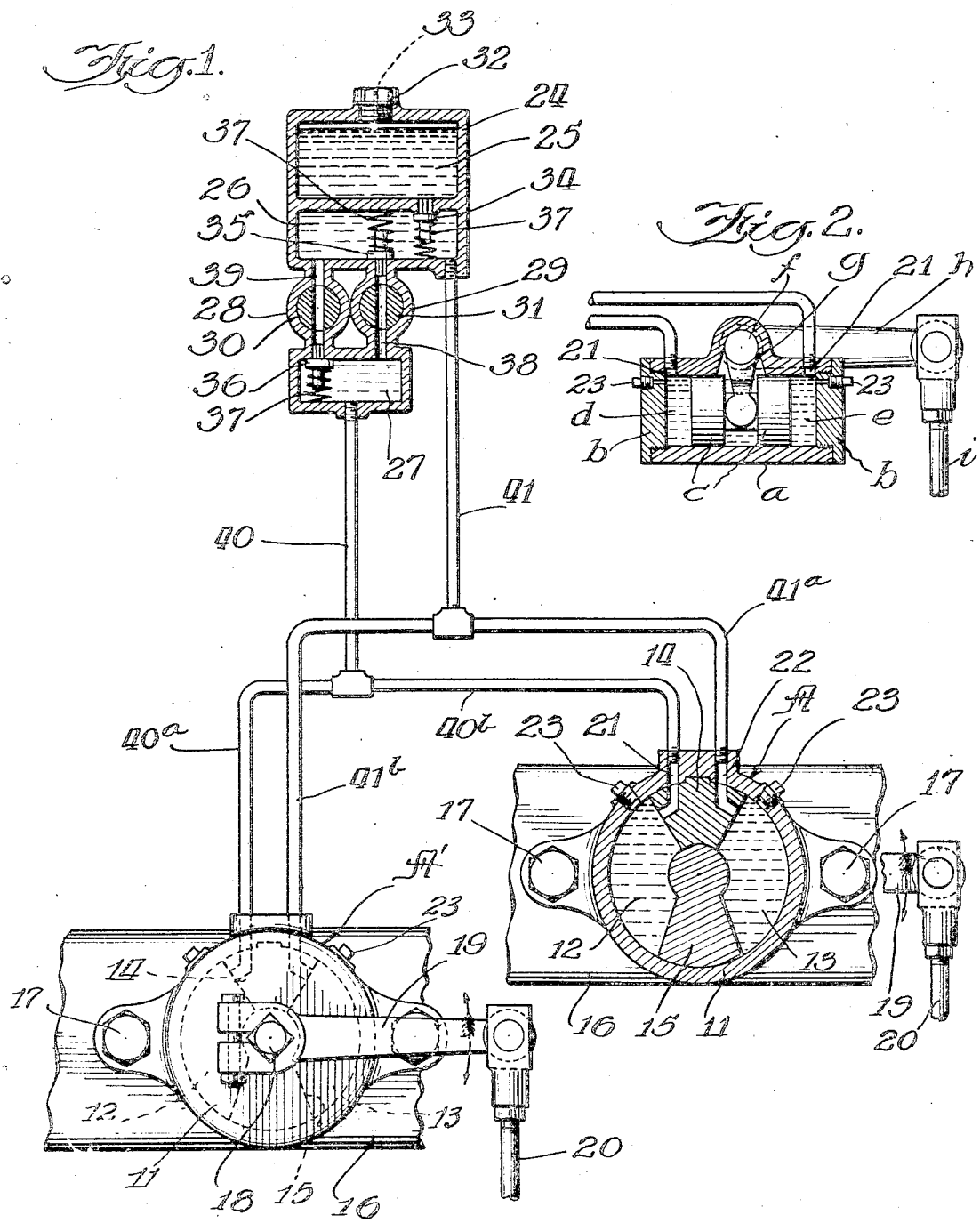

May 8, 1934.   H. H. LOGAN   1,957,658
SHOCK ABSORBER CONTROL
Filed March 4, 1932   3 Sheets-Sheet 3
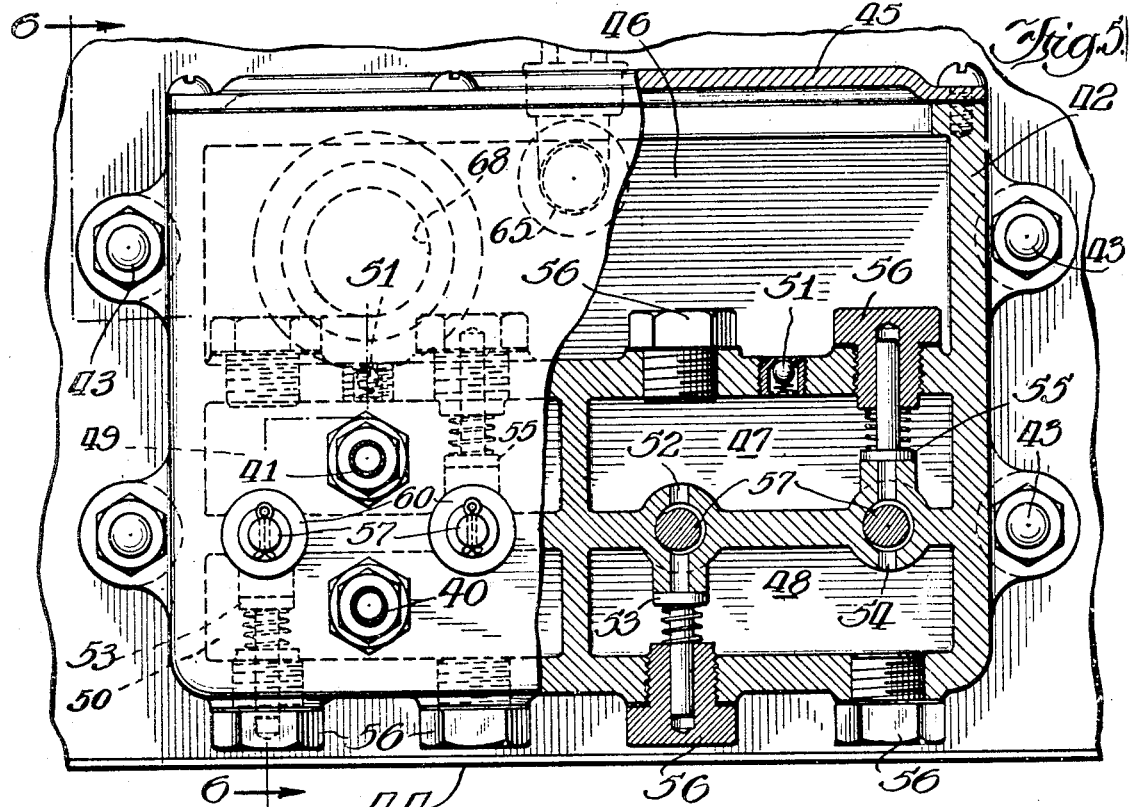
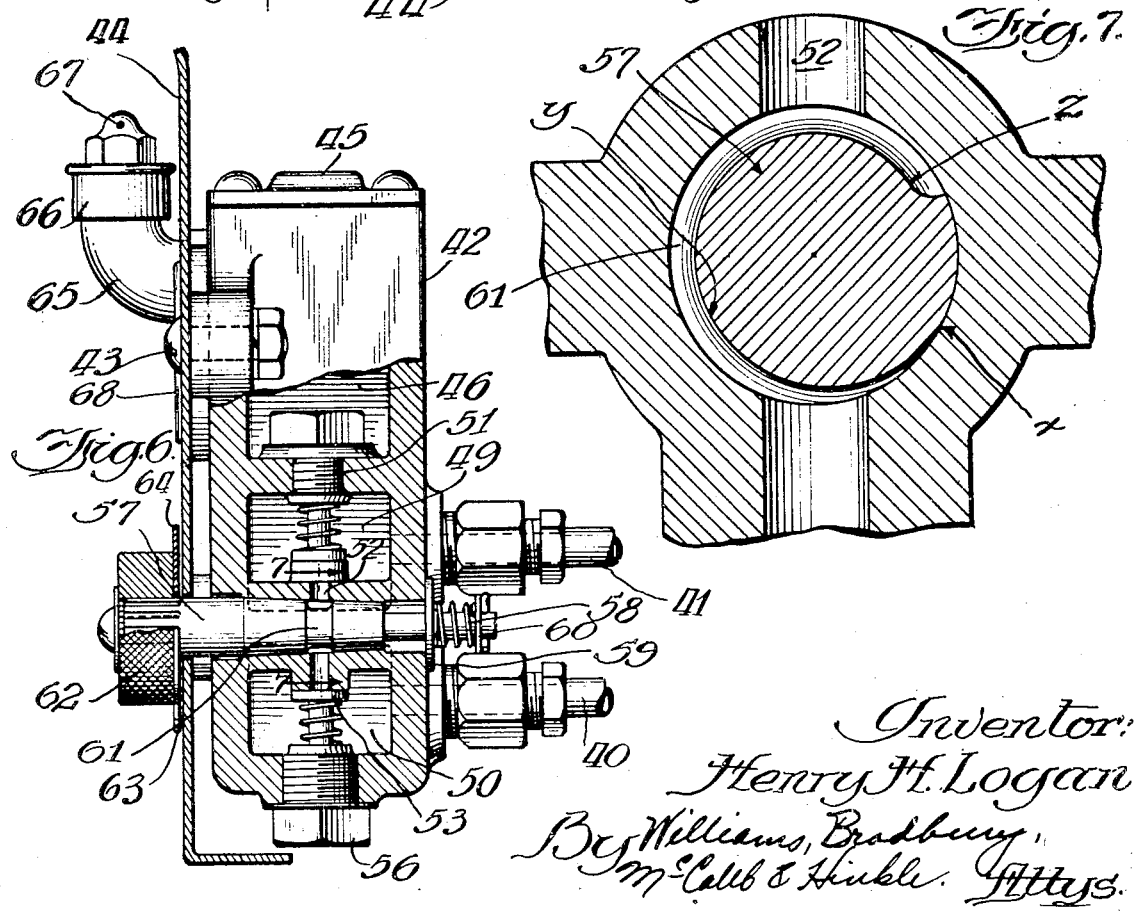
Inventor:
Henry H. Logan
By Williams, Bradbury,
McCalib & Hinkle, Attys.

Patented May 8, 1934

1,957,658

UNITED STATES PATENT OFFICE 1,957,658

SHOCK ABSORBER CONTROL

Henry H. Logan, Chicago, Ill.

Application March 4, 1932, Serial No. 596,780

11 Claims. (Cl. 188—87)

My invention relates to the control of shock absorbers.

Generally speaking, the invention is concerned with the provision of novel hydraulic means for controlling the operation of hydraulic shock absorbers,—such control preferably being centralized at a point which is remote from the shock absorbers and readily accessible to the person exercising the control which the invention affords.

One of the salient features of the invention is the absence of mechanical moving parts between the shock absorbers and the point of centralized control.

Another salient feature of the invention is the regulation of shock absorber performance by liquid columns extending from the shock absorbers to the point where control is exercised.

Another salient feature of the invention is the fact that the control of shock absorber performance, through the liquid columns aforesaid, may be exercised from the driver's position while the vehicle is in motion.

Another salient feature of the invention is that the functioning of the shock absorbers to control upward movement of a vehicle body, relative to its wheels, may be regulated independently of the functioning of the shock absorbers to control downward movement of the vehicle body, and vice versa.

Another feature of the invention is the provision of an arrangement whereby a plurality of shock absorbers may be replenished with liquid from a liquid supply common to all of the shock absorbers.

Other important features of the invention are: a novel type of external control for an hydraulic shock absorber,— preferably effected with a novel style of throttling valve which is peculiarly suitable for the purpose; an hydraulic shock absorber system wherein the shock absorbers proper contain no valves; a shock absorber system comprising means visible to the driver of a vehicle for indicating the shock resisting adjustments of each of a pair or plurality of pairs of shock absorbers; and a shock absorber system comprising a reservoir from which the oil supplied to a plurality of shock absorbers is replenished, and means for indicating at all times whether or not the oil contained in the system is sufficient to meet the requirements of the system.

The foregoing and other features, objects and advantages of my invention will more fully appear from the following detailed description, wherein reference is made to the accompanying drawings, in which Fig. 1 is a simplified and more or less diagrammatic illustration of how the improvements of the present invention may be utilized for the control of a pair of shock absorbers,—the particular shock absorbers here illustrated being of the so-called "movable vane" type;

Fig. 2 illustrates another type of hydraulic shock absorber, i. e. one of the so-called "piston" type, which, along with the "vane" type of shock absorber previously mentioned, is illustrative of a large number of specifically different types of hydraulic shock absorbers which may be controlled in accordance with the teachings of the instant invention;

Fig. 3 is a diagram of the hydraulic connections whereby a preferred embodiment of the present invention exercises control over both the front pair and the rear pair of shock absorbers with which an automotive vehicle chassis is provided;

Fig. 4 illustrates those parts of the present invention which are visible and/or accessible to the driver of the vehicle to which the invention has been applied;

Fig. 5 is a front view (i. e. a view looking toward the driver's position from the front of the vehicle) partly in section and partly in elevation, of the preferred construction of the reservoir and valve housing;

Fig. 6 is a view, partly in section and partly in elevation, taken on the broken line 6—6 of Fig. 5 and looking in the direction indicated by the arrows; and Fig. 7 is a greatly enlarged detail view taken on the line 7—7 of Fig. 6.

Similar characters of reference refer to similar parts throughout the several views.

Shock absorbers for automotive vehicles necessarily are placed where they may become deluged with water, and sometimes become more or less covered with mud, sand and snow. For these reasons, the adjustment of such shock absorbers and the replenishment of the oil supply thereof, when accomplished by instrumentalities forming parts of the shock absorbers themselves, always is a very unpleasant task, and sometimes a very difficult one. Furthermore, in such instances, the replenishment of the shock absorbers with oil always is accompanied by the danger of sand or other foreign material coming into the oil with more or less disastrous results to the shock absorbers.

In the use of practically all hydraulic shock absorbers, if satisfactory results are to be obtained, it is necessary to make adjustments for cold weather as compared with warm weather. When the temperature varies within a wide range, in a comparatively short period of time, it is practically impossible to keep the heretofore used hydraulic shock absorbers properly adjusted for temperature. Furthermore, after a fast run over a rolling road, the fluid in hydraulic shock absorbers frequently becomes much warmer than it was at the start of the run,—therefore, adjustments of the shock absorbers which may have been correct at the start of the run, may prove to be quite incorrect after the vehicle has traveled a substantial distance. Some designers of shock absorbers, appreciating the difficulty last mentioned, have suggested that shock absorbers be provided with thermostats to operate their controlling valves in accordance with the temperature of the liquid therein.

Thermostatic control, however, has not proved to be a satisfactory solution for the problems just discussed. Thermostats are delicate and usually somewhat complicated instruments, which find no proper place on shock absorbers because of the hard usage to which shock absorbers are subjected, and considerations of expense. Moreover temperature, either of the atmosphere or of the oil in the shock absorber, is not the only thing which should determine shock absorber adjustments. Shock absorber adjustments which may be satisfactory when a vehicle is traveling over one kind of road may be quite incorrect when the vehicle is traveling over another kind of road. Moreover, shock absorber adjustments which are correct when a vehicle is carrying a given load, may be quite incorrect when the vehicle is carrying a different load. In addition, the distribution of the load carried by a vehicle may make it desirable to give the shock absorbers associated with the front wheels a different adjustment than the shock absorbers associated with the rear wheels. I know of no thermostat or any other automatic device which is capable of taking the several considerations last enumerated into account in effecting the proper adjustment of shock absorbers. Neither am I familiar with any type of centralized manual control for shock absorbers, heretofore devised, which is capable of controlling the hydraulic shock absorbers of a vehicle so as to cause them all to perform most satisfactorily under changing conditions due to atmospheric temperature, temperature of shock absorber oil due to operation, road conditions, vehicle load, and distribution of vehicle load.

Heretofore, in order to provide vehicle drivers with some measure of shock absorber control, control valves have been introduced into hydraulic shock absorbers,—these control valves being connected with a lever or button located at or adjacent to the driver's position, by means of which the driver can simultaneously and equally effect the adjustment of all of the hydraulic shock absorbers of the vehicle to make them more free or more sluggish in their operation. Such installations, however, introduce into the construction of a vehicle a considerable amount of mechanical equipment which must be frequently serviced, and is in constant danger of damage by stones thrown from the wheels, as well as corrosion and damage from being deluged or covered with water, sand, mud, etc. Within my experience, the link and lever mechanisms of such mechanical shock absorber controls have become so loaded with mud and ice as to become immovable, and hence entirely useless.

At best, expedients of the kind last mentioned are very inadequate, because they must either (a) affect movements of all of the shock absorbers in one direction only, or (b) similarly affect movements of all of the shock absorbers in two directions. Most hydraulic shock absorbers, being double acting, should have separate adjustments, depending upon temperature, road conditions, vehicle load and distribution of load, for each direction of movement. Furthermore, the shock absorbers at the front of the vehicle frequently should be adjusted differently from those at the rear of the vehicle.

I shall now proceed to describe a shock absorber system which eliminates the disadvantages herein discussed, and which enables the driver of a vehicle, while the vehicle is in motion, correctly to adjust all of his shock absorbers to compensate for changes in temperature, road conditions, load and distribution of load,—the system providing and/or permitting the use of simplified and reliable shock absorbers which can be manufactured at relatively low cost.

Referring now to Fig. 1, at A and A' I have shown a pair of hydraulic shock absorbers which generically are of a well known type, i. e. the so-called "movable vane" type. These shock absorbers may be regarded as the pair associated with either the front springs or the rear springs of an automotive vehicle.

Each shock absorber comprises a casing 11 providing a closed circular chamber which is divided into two liquid compartments, 12 and 13, by a fixed wall or vane 14 and a movable wall or vane 15. The vehicle frame portion to which each of the casings 11 is fixedly secured is indicated at 16, the attachment conveniently being effected by bolts 17—17. The shaft 18 of each movable vane 15 is fixedly attached to an arm 19, which in turn is connected, by a link 20, to the vehicle axle, or to the vehicle spring in the vicinity of its attachment to the axle, in the usual manner.

The parts thus described constitute the shock absorber proper, which need not differ from well known vane type shock absorber construction, except in the particulars which I shall now mention. I prefer to use shock absorbers which comprise no valves but which are provided with liquid ports 21 and 22 and with air exhaust ports which normally are tightly closed by the threaded plugs 23—23.

It will be understood that when either of the arms 19 is actuated in the direction of the feathered arrow (which actuation is caused by movement of the vehicle frame toward an axle) the vane 15, connected with such arm, will move to enlarge chamber 12 and to ensmall chamber 13. Similarly, when arm 19 is actuated in the direction of the unfeathered arrow (caused by movement of the vehicle frame away from an axle) the vane will move to ensmall chamber 12 and enlarge chamber 13.

I am in no sense limited to the use of hydraulic shock absorbers of the vane type. In Fig. 2, for instance, I have shown a so-called "piston" type hydraulic shock absorber which, for the purposes of the present invention, may be substituted for the vane type of shock absorber illustrated in Fig. 1. The piston type shock absorber of Fig. 2 comprises a cylinder $a$ (attachable to a vehicle frame in any suitable manner not shown); cylinder heads $b$—$b$; a piston $c$, dividing the cylinder into two liquid compartments $d$ and $e$; a rock shaft $f$; a bifurcated arm $g$, by which motion is transmitted from the rock shaft to the piston; arm $h$ attached to the rock shaft; and link i which connects arm h to or with a vehicle axle in the usual manner. When arm h is moved in the direction of the feathered arrow, chamber d is enlarged and chamber e is ensmalled; and when arm h is moved in the direction of the unfeathered arrow, chamber d is ensmalled and chamber e is enlarged. This piston type of shock absorber, which for my purposes preferably is devoid of valves, is provided with liquid ports 21 and 22 and air exhaust port plugs 23—23 corresponding in purpose with the similarly designated parts of the vane type shock absorber illustrated in Fig. 1.

So far as the principles and practice of my invention are concerned, the hydraulic shock absorbers proper may be of any approved construction. However, I prefer to employ double acting hydraulic shock absorbers, i. e. shock absorbers which comprise liquid chambers which are differentially enlarged and ensmalled as the vehicle frame moves toward and away from the axles on which it is supported.

Reverting again to Fig. 1, at 24 I have illustrated a casing which I prefer to locate on a vehicle at a point above the shock absorbers and in such a position that the throttling valves, presently to be described, may be operated by the driver while the vehicle is in motion. Casing 24 provides: an oil reservoir 25, check valve chambers 26 and 27, and housings 28 and 29 for manually operable throttling valves 30 and 31.

Reservoir 25 is provided with a filling opening normally closed by plug 32. The plug, however, preferably is provided with a fine air bleed opening 33 so that there will be no tendency to create a partial vacuum in the top of the reservoir when the liquid therein flows downwardly therefrom to replenish the system, as will presently be explained.

At 34, 35 and 36 are shown three check valves, each of which is provided with a light spring 37. Check valves 34 and 35 are located in the chamber 26, while check valve 36 is located in the chamber 27. Check valve 34 seats against pressure from reservoir 25. Check valve 35 seats against pressure from passage 38, and check valve 36 seats against pressure from passage 39.

Passages 38 and 39, which extend between the check valve chambers 26 and 27, are adapted to be variably and independently throttled by the manually operable valves 31 and 30, respectively.

Communicating with check valve chamber 27 is a metallic conduit 40 having branches 40—a and 40—b which communicate with ports 21—21 of the shock absorbers A and A'. Similarly communicating with check valve chamber 26 is a conduit 41 having branches 41—a and 41—b communicating with the ports 22—22 of the shock absorbers.

In putting the system into operation, the air vent plugs 23—23 of the shock absorbers are removed and oil, or other suitable shock absorber liquid, is supplied to reservoir 25 until such liquid begins to flow out of each of the shock absorber air vents. When liquid appears at each air vent it is closed by its plug 23. After the closure of all of the air vents, further liquid is then supplied to the system completely to fill all passages below the reservoir and substantially to fill the reservoir. The reservoir plug 32 is now replaced and the manually operable valves 30 and 31 are given initial settings, i. e. usually settings in which they tend somewhat to restrict the passages 39 and 38 which they control. The system now is ready to be put into operation.

Let us assume that the vehicle wheel nearest shock absorber A encounters a road bump, causing the arm 19 of shock absorber A to move upwardly. Such movement of the arm causes vane 15 to enlarge chamber 12 and ensmall chamber 13. The result of the ensmallment of chamber 13 is an upward movement of the column of liquid occupying pipe 41 and its branch 41—a, accompanied by a displacement of liquid from chamber 26 and a downward movement of the column of liquid occupying passage 39, valve 28, chamber 27, pipe 40 and branch pipe 40—b; this downward movement of liquid tending to keep chamber 12 filled with liquid despite its temporary enlargement. Under the conditions just stated, the check valve 34 prevents flow of liquid from chamber 26 into the reservoir, and check valve 35 prevents flow of liquid from chamber 26 through manually operable valve 31.

From the foregoing it will be understood that it is the setting of manually operable valve 28 (and not the setting of manually operable valve 29) which controls the movement of liquid resulting from ensmallment of either or both of the shock absorber compartments 13—13, i. e. it is the setting of the manual valve 28 which determines the resistance which the shock absorbers exert against movement of the vehicle frame and axle toward each other. It is the setting of manually operable valve 29, however, which determines the resistance which the shock absorbers exert against separating movements of the vehicle frame and axle. Thus in the event of ensmallment of either or both of the shock absorber compartments 12, there is an upward movement of the column of liquid occupying pipe 40 (and its affected branch or branches), chamber 27, passage 38, valve 31,—accompanied by a downward displacement of the column of liquid occupying pipe 41. Under these conditions, check valve 36 prevents flow of liquid through manually operable valve 30, while check valve 34 acts to prevent displacement of liquid from chamber 26 into the reservoir 25.

It should be understood that actuation of the movable element of any shock absorber (whether that movable element be a vane, piston or other movable wall) will cause a corresponding movement of the liquid columns which connect the shock absorber with the controlling devices at the operator's position; the freeness or stiffness with which the movable element of the shock absorber moves in either direction being determined by the degree to which the driver of the vehicle has elected to restrict the then functioning one of two paths between said liquid columns.

If any leakage of liquid from the system occurs, at the shock absorber shaft bearings or elsewhere, the system automatically is replenished from reservoir 25 through check valve 34, which, however, acts to prevent upward flow of liquid into the reservoir.

I shall now describe that embodiment of my invention which is exhibited in Figs. 3 to 7 inclusive,—being that exemplification of the invention which preferably is employed in connection with an automotive vehicle having a pair of shock absorbers at both front and rear.

In Fig. 3 I have indicated by dotted lines the frame and supporting springs of a vehicle to which the improvements of the present invention have been applied. The shock absorbers at the front of the vehicle are indicated at A and A' and the shock absorbers at the rear of the vehicle are indicated at B and B'. The conduits through which the shock absorbers A and A' are hydraulically controlled from the driver's position are indicated at 40 and 41, each of these conduits having branches leading to the proper ports of the shock absorbers A and A'. The conduits through which the rear pair of shock absorbers B and B' are hydraulically controlled from the driver's position are indicated at 40' and 41', each of these last mentioned conduits being provided with branches leading to the proper ports of the shock absorbers B and B'. The several shock absorbers shown in this figure may be, and preferably are, of the type illustrated in Fig. 1. It should be remembered, however, that the present invention contemplates the use of practically any kind of hydraulic shock absorber, although preferably a type of hydraulic shock absorber which comprises liquid chambers which are differentially ensmalled and enlarged as the shock absorber operates.

In this preferred embodiment of my invention, the controlling device comprises a casing 42 adapted to be secured by screws 43—43 to the instrument board 44 of the vehicle, in such a way that the shock absorber control buttons, filler nozzle and sight glass (all presently to be described) are visible and/or accessible to the driver from his driving position.

The casing, which may be provided with a removable top plate 45, has internal horizontal and vertical walls which divide the interior of the casing into five distinct compartments, namely the liquid reservoir 46 and check valve chambers 47, 48, 49 and 50. Check valve chambers 47 and 48 have only to do with the control of the rear pair of shock absorbers B and B', whereas check valve chambers 49 and 50 similarly have only to do with the control of the front set of shock absorbers A and A'.

Each of the upper check valve chambers 47 and 49 is adapted to receive liquid from the reservoir 46 through an upwardly seating ball check valve 51. Check valve chambers 47 and 48 respectively communicate with the conduits 40' and 41' (Fig. 3) through which hydraulic control is exercised over the rear pair of shock absorbers B and B'. Check valve chambers 49 and 50, respectively, are similarly connected with the conduits 40 and 41 through which hydraulic control is exercised over the front pair of shock absorbers A and A'.

The instrumentalities which control the flow of liquid between the check valve chambers 47 and 48 are identical with the instrumentalities which control communication between the check valve chambers 49 and 50. I shall, therefore describe only the manual and automatic valve mechanisms which control movements of liquid from check valve chamber 47 to check valve chamber 48, and vice versa.

Movement of liquid from check valve chamber 47 to check valve chamber 48 can occur only through a passage 52. Movement of liquid from chamber 48 to chamber 47 cannot occur through passage 52 by reason of a spring pressed check valve 53 which closes the passage 52 whenever pressure in the chamber 48 exceeds the pressure in the chamber 47. Similarly movement of liquid from chamber 48 into chamber 47 can occur only through a passage 54 with which is associated a spring pressed check valve 55 which closes the passage 54 whenever the pressure within chamber 47 exceeds the pressure within chamber 48. The check valves 53 and 55 conveniently have stems which are supported and guided by appropriately located ones of the threaded plugs 56—56 which are provided to close openings which are necessarily or desirably formed in order to facilitate the casting and/or machining of the internal walls of the casing 42.

Each of the passages 52 and 54 (as well as the corresponding passages which afford communication between the check valve chambers 49 and 50) is adapted to be controlled by a manually operable throttling valve 57 of the kind most clearly illustrated in Figs. 6 and 7. This throttling valve, in each instance, is tapered in the longitudinal direction and occupies a suitable conical bore at right angles to the passage over which said valve is intended to exercise throttling control. A spring 58, associated with each such throttling valve, keeps it at all times tightly but rotatably seated in its conical bore. The spring 58, in each instance, is disposed around the reduced extremity of its associated valve, said spring being under compression between a pair of washers which also encircle said reduced extremity, one of said washers, 59, bearing against the casing 42, and the other of the said washers, 60, bearing against a pin extending through said reduced extremity of the value.

Each of the manually operable valves 57 is provided with a groove 61 in registry with the two portions of the passage which the valve controls. It will be noted that the groove 61 is of varying depth, the depth of the groove being zero at point X and gradually increasing to a maximum at point Y and then continuing at the maximum depth around to the point Z (see Fig. 7). By reason of this formation of the groove 61, the valve 57 serves by its adjustment, within a very short range of rotary movement, to throttle to any desired degree, or to no degree, the passage which the valve controls.

Each of the manually operable throttling valves 57 is provided with an operating button 62 which is readily accessible to the driver of the vehicle. Fixed to each of the buttons 62 is a pointer 63 cooperating with a suitable index, and also carried with each button 62 is a stop 64 adapted to cooperate with suitable fixed pins to determine the movement range of the valve with which the button is associated (see Fig. 4).

The instrument board is preferably marked, as indicated in Fig. 4, to show that the right hand pair of buttons 62 may be manipulated to effect hydraulic control over the front pair of shock absorbers, and that the left hand pair of buttons may be operated to effect hydraulic control over the rear set of shock absorbers. Similarly, the instrument board is marked to indicate that the right hand button 62 of each pair exercises control over shock absorber action resulting from upward movement of the vehicle frame relative to the wheels with which the shock absorbers are associated, and that the left hand button of each pair exercises control over shock absorber action resulting from downward movement of the vehicle relative to the wheels with which the shock absorbers are associated.

The liquid reservoir 46 is provided with a filler nozzle 65, which preferably is accessible from the driver's position, this nozzle being equipped with a closure cap 66 in which may be formed a small aperture 67 to prevent the creation of a partial vacuum in the top of the reservoir due to a fall of the level of the liquid therein. The reservoir 46 likewise is provided with a sight glass 68, visible to the operator through the instrument board of the vehicle, so that the operator may be apprised at all times as to whether or not his shock absorber system contains an adequate quantity of the oil or other liquid which is employed to control the operation of the shock absorbers.

The driver of a vehicle equipped with a shock absorber system of the kind herein exhibited can control his shock absorbers so as to make them perform most satisfactorily under all changes in the operating conditions affecting their performance. Among the operating conditions which affect the performance of shock absorbers are (a) temperature changes, (b) changes in the character of the road over which the vehicle is traveling (c) changes in load, (d) changes in distribution of load.

Changes in the operating conditions just mentioned may render it desirable to (1) modify the action of all of the shock absorbers in resistance to both "up" and "down" shocks; (2) modify the action of both pairs of shock absorbers in resistance to "up" or "down" shocks only; (3) modify the action of but one pair of shock absorbers in resistance to shocks in one direction while modifying the action of the other pair in resistance to shocks in the opposite direction; (4) modify the action of only one pair of shock absorbers in resistance to both "up" and "down" shocks; or (5) modify the action of only one pair of shock absorbers in resistance to "up" or "down" shocks without modifying the action of said pair in resistance to shocks in the opposite direction.

The shock absorber system herein described enables the vehicle driver to effect with ease and facility, any of the hereinbefore mentioned modifications of shock absorber action,—the proper button or buttons to be operated, as well as the proper direction or directions in which to operate same to secure the requisite results, being clearly revealed by the indicia associated with the operating buttons.

The shock absorber system herein described is highly advantageous in that the pointers of the control buttons cooperate with their respective graduated scales to reveal how the shock absorbers of each pair are adjusted to resist both "up" and "down" shocks.

Other advantages of the herein described shock absorber system will be apparent to those skilled in the art to which my invention relates.

The accompanying drawings exhibit structures which may be varied greatly without departing from the scope of my invention.

What I claim is new and desire to secure by Letters Patent of the United States is:

1. Means for controlling the operation of hydraulic shock absorbers, said means comprising a pair of liquid compartments adapted for connection with appropriate shock absorber chambers, a pair of throttling devices through which liquid exchanges between said compartments may occur, and means associated with the throttling devices requiring that the flow through each throttling device be opposite to the flow of liquid through the other throttling device.

2. Means for effecting hydraulic control of a double acting shock absorber at a point remote from said shock absorber, said means comprising two shock absorber controlling liquid columns extending therefrom, a first passage at said remote point to permit liquid exchanges in one direction only from one to the other of said liquid columns, a second passage at the said remote point adapted to permit liquid exchanges from column to column in the opposite direction only, and manually operable valves for variably throttling said passages.

3. In a mechanism for controlling the functioning of a shock absorber having liquid chambers which are differentially enlarged and ensmalled in the operation of the shock absorber, columns of confined liquid extending from said chambers to a point remote from said shock absorber and subject to varying pressures, means at said remote point for permitting and variably and independently restricting oppositely directed liquid exchanges between said columns.

4. In a mechanism for controlling the functioning of a vehicle shock absorber of the type having liquid chambers, which are differentially enlarged and ensmalled in the operation of the shock absorber, liquid containing conduits extending from said chambers to the driver's position, means at the driver's position permitting liquid pressure exchanges between said conduits, means for throttling said pressure exchanges in one direction, and means for independently throttling pressure exchanges in the opposite direction.

5. In a mechanism for controlling the functioning of a vehicle shock absorber of the type having liquid chambers which are differentially enlarged and ensmalled in the operation of the shock absorber, and liquid filled conduits extending from said chambers to the driver's position, means at the driver's position permitting liquid pressure exchanges between the said conduits, a pair of independent throttling devices through which pressure exchanges between said conduits may occur, and means for insuring that the pressure exchanges through each throttling device are directionally opposite to those occurring through the other throttling device.

6. In a mechanism for effecting ride control in the normal operation of a vehicle equipped with one or more shock absorbers, a pair of independently regulable throttling devices locatable on the vehicle adjacent the driver's position and adapted to permit and variably and differentially throttle oppositely directed liquid pressure exchanges between a pair of conduits containing shock-absorber-controlling liquid columns, and automatic valve means requiring that oppositely acting liquid pressure exchanges between said conduits shall be subject to the domination of different ones of said independently regulable throttling devices.

7. A mechanism for controlling the functioning of a plurality of double acting hydraulic shock absorbers, said controlling mechanism comprising a pair of liquid compartments, a pair of throttling devices through which liquid exchanges between said compartments may occur, and means insuring that the liquid exchanges occurring through each throttling device are opposite in direction to those occurring through the other throttling device, said compartments, being adapted to communicate, by liquid containing conduits, with corresponding liquid chambers of the controlled shock absorbers.

8. A device for effecting centralized control over a plurality of hydraulic shock absorbers, liquid compartments in said control device, conduits adapted to extend from said compartments to appropriate liquid chambers of the controlled shock absorbers and to contain columns of a liquid which also fills said compartments, conduits and chambers, means for permitting oppositely directed liquid pressure exchanges between said compartments, and means for regulating pressure exchanges in each direction independently of the regulation of pressure exchanges in the opposite direction.

9. In a mechanism for effecting ride control in the normal operation of a vehicle equipped with one or more shock absorbers, a pair of independently regulable throttling valves locatable on the vehicle adjacent the driver's position and adapted to permit and variably and differentially throttle oppositely directed liquid pressure exchanges between a pair of conduits containing shock-absorber-controlling liquid columns, and automatic one-way valves, one associated with each of said throttling valves, requiring that oppositely acting liquid pressure exchanges between said conduits shall be subject to the domination of different ones of said manually regulable throttling valves.

10. In a mechanism for controlling the functioning of hydraulic shock absorbers, a liquid reservoir, a pair of liquid compartments located adjacent to and beneath said reservoir, said compartments being adapted for connection with appropriate shock absorber chambers, a pair of throttling devices through which liquid exchanges between said compartments may occur, means associated with the throttling devices requiring that the flow of liquid through each throttling device be opposite to the flow of liquid through the other throttling device, and a passage, controlled by a one-way valve, adapted to permit flow of liquid from said reservoir into one of said compartments.

11. In a mechanism for effecting centralized control over the functioning of hydraulic shock absorbers, a liquid reservoir, means adapted visually to indicate the quantity of liquid contained by said reservoir, a pair of liquid compartments located adjacent to and beneath said reservoir, said compartments being adapted for connection by suitable conduits with appropriate shock absorber chambers, a pair of manually operated throttling valves through which liquid pressure exchanges between said compartments may occur, automatic one-way valves associated with the throttling valves requiring that the flow of liquid through each throttling valve be opposite to the flow of liquid through the other throttling valve, a passage adapted to permit flow of liquid from said reservoir into one of said compartments, and an automatic valve, seating against pressure from the reservoir, controlling said passage.

HENRY H. LOGAN.